(12) United States Patent
Saga

(10) Patent No.: US 8,715,534 B2
(45) Date of Patent: May 6, 2014

(54) METHOD FOR PRODUCING COMPOSITE MEMBER OF METAL MEMBER AND RESIN MEMBER

(75) Inventor: Yuji Saga, Utsunomiya (JP)

(73) Assignee: E I du Pont de Nemours and Company, Wilmington, DE (US)

( * ) Notice: Subject to any disclaimer, the term of this patent is extended or adjusted under 35 U.S.C. 154(b) by 224 days.

(21) Appl. No.: 12/414,716

(22) Filed: Mar. 31, 2009

(65) Prior Publication Data
US 2009/0250666 A1 Oct. 8, 2009

Related U.S. Application Data

(60) Provisional application No. 61/123,114, filed on Apr. 3, 2008.

(51) Int. Cl.
*H01B 1/02* (2006.01)
(52) U.S. Cl.
USPC ..... 252/512; 264/328.14; 264/403; 428/64.4; 428/141; 442/1; 524/439
(58) Field of Classification Search
USPC ............... 52/512; 264/403, 328.14; 428/64.4, 428/141; 524/439; 442/1; 252/512
See application file for complete search history.

(56) References Cited

U.S. PATENT DOCUMENTS

| | | | |
|---|---|---|---|
| 4,340,551 A * | 7/1982 | Wada et al. | 264/403 |
| 5,378,516 A * | 1/1995 | Arahara | 428/64.4 |
| 6,995,205 B2 * | 2/2006 | Matsukawa et al. | 524/439 |
| 2003/0111647 A1 | 6/2003 | Rosenzweig | |
| 2003/0153223 A1 * | 8/2003 | Matsumoto et al. | 442/1 |
| 2006/0257624 A1 * | 11/2006 | Naritomi et al. | 428/141 |

FOREIGN PATENT DOCUMENTS

| | | | | |
|---|---|---|---|---|
| DE | 199 62 408 | | 6/2001 | |
| EP | 0 478 246 | | 1/1992 | |
| EP | 0 478 246 | | 4/1992 | |
| JP | 06-264104 | * | 9/1994 | B22F 3/02 |
| WO | WO 03/029352 | * | 4/2003 | F04D 29/02 |

OTHER PUBLICATIONS

Japan Abstract 2003028986, Jan. 29, 2003, Mitsubishi Plastics Ind. Ltd.
Japan Patent 2,878,967, Nakagawa et al.
Japan Abstract 2003038986, Jan. 29, 2003, Mitsubishi Plastics Ind. Ltd.
Japan Patent 2,872,967 Nakagawa et al.

* cited by examiner

*Primary Examiner* — Khanh Tuan Nguyen

(57) ABSTRACT

The invention discloses an injection molding method for manufacture of a metal-resin composite member; wherein the resin composition used in the method includes a plurality of metal particles having one or more metal melting points between about 200° C. and 400° C.; the resin composition is heated to a temperature higher than the resin melting point and higher than one or more metal melting points to provide a heated resin composition; and wherein injecting the heated resin into a mold results in contact of the heated resin with one or more disposed heated metal member(s) to provide a composite member.

14 Claims, 2 Drawing Sheets

METHOD FOR PRODUCING COMPOSITE MEMBER OF METAL MEMBER AND RESIN MEMBER

FIELD OF THE INVENTION

The present invention relates to material science and a method for molding composite members having metal members and polymer resin members.

BACKGROUND OF INVENTION

Parts made only of either metal members or resin members are commonly used in the fields of automobiles, electronic devices, industrial machinery, and the like. That is, a commonly used method is to produce members made of metal or members made of resin, which are then assembled. By contrast, there has recently been more interest in composite members which include both metal members and resin members in the interests of fully exploiting the features of both metal and resin, producing more light-weight members, and reducing costs of manufacturing.

An example of a method for producing composite members of metal members and resin members is a technique utilizing insert molding. When a composite member is formed using insert molding, a metal member is first inserted in the mold. Molten resin is then injected into the mold, filling the mold with resin. The resin is cooled to solidification, and the composite member of the desired shape is taken out of the mold.

However, because resin and metal are inherently difficult to bond, the resulting composite members tend to separate where the component members are joined together. JP Patent No. 2,878,967 (Nakagawa, et al.) discloses a method to strengthen adhesion between resin and metal in metal-insert molding process comprising pretreating the metal surface with an alkoxysilane compound. JP laid open patent No. 2004-346255 discloses a polyimide composition containing a silane coupling agent and an epoxy-modified styrene elastomer to strengthen adhesion with metal.

There is a need to develop means for improving the bonding strength between the metal and resin without additional process steps.

Furthermore, when the resin has high thermal conductivity, early solidification of the resin is a problem. In other words, because of the high thermal conductivity of the resin, the resin tends to solidify while the mold is being filled with the resin, preventing the resin from spreading throughout the mold.

With respect to techniques for heating the resin supplied to a mold, U.S. Pat. No. 4,340,551 has disclosed a technique in which IH is employed to control the temperature of mold surface where the resin is supplied.

SUMMARY OF INVENTION

An object of the invention is to provide a method for producing composite members having powerful bonding strength between metal members and resin members.

One embodiment of the invention is a method for producing a composite member having a metal member and a resin member, the method comprising the steps of:

a) providing a resin composition comprising (i) thermoplastic resin having a resin melting point and/or a glass transition, and a solidification point; and (ii) a plurality of metal particles having one or more metal melting points between about 130° C. and 400° C.; disposing one or more metal member(s) in a mold cavity, each said metal member(s) having at least one exposed surface, and said mold cavity, optionally, having at least one mold cavity exposed surface;

b) heating the one or more metal member(s) to a temperature equal or higher than at least one of the melting points of the plurality of metal particles to provide one or more heated metal member(s);

c) heating the thermoplastic resin composition to a temperature higher than the resin melting point or the glass transition temperature and higher than one or more metal melting points to provide a heated resin;

d) injecting the heated resin into the mold to contact each heated metal member(s) exposed surface to provide a heated composite member; and e) cooling said heated composite member below the resin solidification point.

f) A further embodiment of the invention is composite member made by the method as disclosed above.

DETAILED DESCRIPTION OF THE INVENTION

Figure 1:
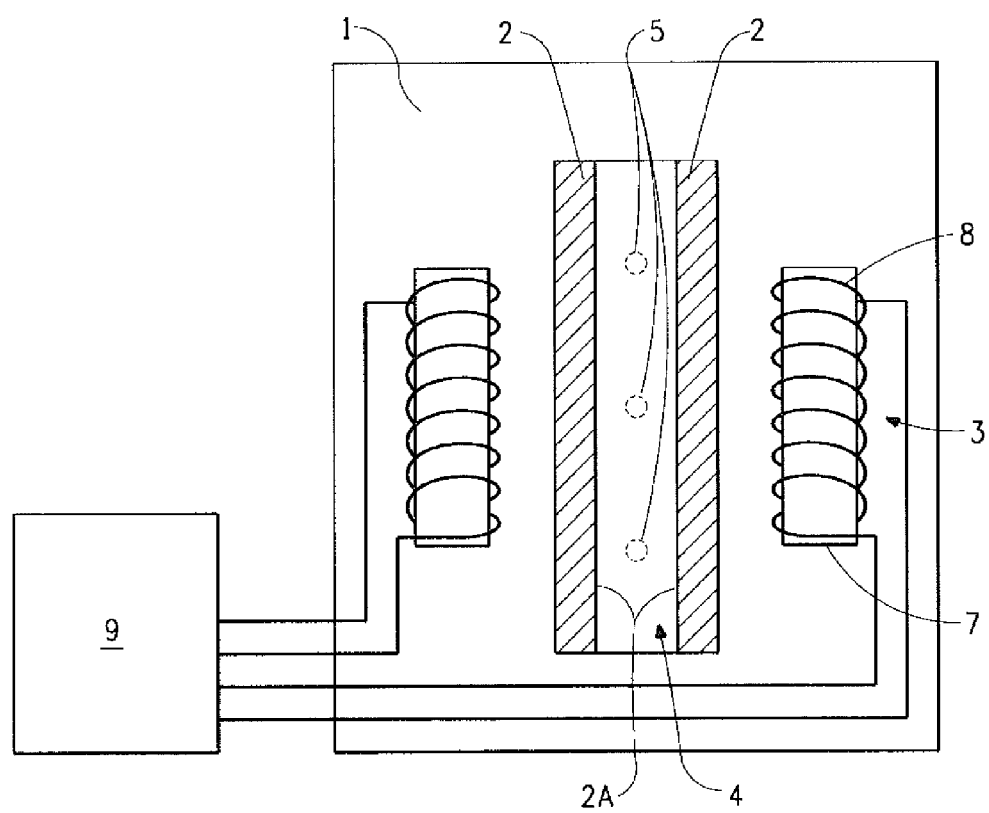
FIG. 1 illustrates a mold for practicing the method of the invention.

The method of the invention requires a resin composition having i) a thermoplastic resin having a resin melting point and/or a glass transition, and a solidification point; and (ii) a plurality of metal particles having one or more metal melting points. The melting point and glass transition temperature of the thermoplastic resin and metal melting points can be determined by peak temperature obtained by differential scanning calorimetry (DSC) in a heating cycle; and the resin solidification point can be determined in a corresponding cooling cycle from the melt according to ASTM D 3418.

The resin is a thermoplastic resin that is crystalline, semi-crystalline or amorphous. Examples of thermoplastic resins useful in the invention include polyolefin resins such as polyethylene and polypropylene, polyamide resins such as nylon-6, nylon-66, nylon-11, nylon-12, and aromatic polyamides, polyester resins such as polyethylene terephthalate, polybutylene terephthalate, and polycyclohexylmethylene terephthalate, and ABS resins, polycarbonate resins, modified polyphenylene ether resins, polyacetal resins, polyphenylene sulfide resins, fully aromatic polyester resins, polyether ether ketone resins, polyether sulfone resins, polysulfone resins, and polyamide-imide resins. Copolymers of any combination of components forming such resins are also included. These thermoplastic resins may also be used individually or in combinations of two or more. Preferred thermoplastic resins for various aspects of the invention include those selected from the group consisting of polyamide resins, polyester resins, polyphenylene sulfide resins. Preferably, the resin has a melting point or glass transition temperature higher than 150° C., and more preferably between 200° C. and 400° C. A preferred resin class is liquid crystal polyesters wherein both the diol and diacid component have aromatic ring.

The "plurality of metal particles" having one or more metal melting points includes a single metal composition having a single metal melting point or a mixture of metal compositions having multiple metal melting points. The metal melting points may be determined using DSC; and are evidenced by one or more significant endotherm(s) in the heating scan. Preferably low-melting metals are used in the method of the invention having melting points, at the peak of the endotherms as observed by DSC, of between 130° C. and about 400° C., and more preferably between 200° C. and about 300° C. Examples of such low-melting metals include Sn alloys such as Sn—Cu, Sn—Al, Sn—Zn, Sn—Te, Sn—Pt, Su—P, Sn—Mn, Sn—Sb, Sn—Ag, Sn—Ag—Cu, Sn—Ag—Cu—Bi, Sn—Ag—Cu—Sb, Sn—Ca, Sn—Mg, Sn—Au, Sn—Ba, and Sn—Ge; and Li alloys such as Al—Li, Cu—Li, and Zn—Li. Preferred metal compositions are Sn—Cu, Sn—Sb, Sn—Al, Sn—Zn, Sn—Pt, Sn—Mn, Sn—Ag, Sn—Ag—Cu, Sn—Ag—Cu—Bi, Sn—Ag—Cu—Sb, Sn—Au, Al—Li, and Zn—Li. More preferred are Sn—Cu, Sn—Al, and Sn—Zn. It is even more preferable to use Sn—Cu alloys, as they are available with a range of melting points.

The metal particles can include spherical, flaked, and needled shapes; as so desired by the artisan. The metal particle diameter is not particularly limited. However, from the perspective of contributing to the adhesive strength between the metal member and resin member, the particle diameter before being blended with the resin is preferably 1 to 300 µm. By particle diameter is meant the weight-average mean particle diameter that can be determined using a laser diffraction type particle size distribution analyzer such as a Cirrus Granulometer (Model 920) or a Coulter laser diffraction type particle size distribution analyzer (LS-230).

Other materials may be added as needed, in addition to the resin and metal particles, in the resin composition. Additives include flame retardants, reinforcing agents, inorganic fillers, plasticizers, rubbers, nucleating agents, flame retardant synergists, heat stabilizers, antioxidants, dyes, pigments, mold release agents, lubricants, UV stabilizers, adhesion promoters other than the metal particles disclosed above, and the like.

The content of each component in the resin composition is not particularly limited and may be determined as desired according to the functions required of the molded product and the materials that are used. In one embodiment, based on the total volume of the resin member, the resin member will preferably include the resin in an amount of 95 to 30 vol %, and more preferably 80 to 40 vol %. The plurality of metal particles will preferably be included in an amount of 1 to 20 vol %, and more preferably 3 to 10 vol %.

The method of the invention further requires one or more metal member(s). Any metal or metal alloy, having at least 100° C. higher melting point than the highest temperature used in the method, may be used as the metal member, such as steel, nickel, chromium, copper, zinc, titanium, aluminum, or magnesium, or alloys of such metals. In one embodiment the one or more metal member(s) have at least one surface formed with aluminum or iron.

A mold (1) for practicing the method of the invention is illustrated in FIG. 1. Metal members (2) are disposed in the proximity of heaters (3) within the mold cavity (4). The heaters (3) are used in heating the metal members and, optionally, the mold cavity (4). The heaters (3) are preferably induction heaters having a metal core (7), a coil (8) for conducting current, and a power supply (9).

The mold (1) may have additional heaters (not shown) to provide additional heating to the mold cavity (4). One or more resin injection ports (5) provides heated resin to the mold cavity (4) such that when injected the heated resin contacts the metal member exposed surface (2A).

The method of the invention includes (b) disposing one or more metal member(s) in a mold cavity (4); such that at least one exposed surface (2A) of the metal member remains available to the resin, to be injected. The one or more metal members may be pre-heated outside the mold, before disposing in the mold cavity, if so desired by the artisan. In one embodiment the at least one exposed surface of the metal member (2A), optionally, can be pre-treated with a coupling agent to further enhance adhesion with the resin to be injected. Examples of coupling agents include silane, titanate, zirconate, aluminate, and zircoaluminate coupling agents.

Metal hydroxides and alkoxides useful as coupling agents include those of Group IIIA thru VIIIa, Ib, IIb, IIIb, and IVb of the Periodic Table and the lanthanides. Specific coupling agents are metal hydroxides and alkoxides of metals selected from the group consisting of Ti, Zr, Mn, Fe, Co, Ni, Cu, Zn, Al, and B. Preferred metal hydroxides and alkoxides are those of Ti and Zr. Specific metal alkoxide coupling agents are titanate and zirconate orthoesters and chelates including compounds of the formula (I), (II) and (III):

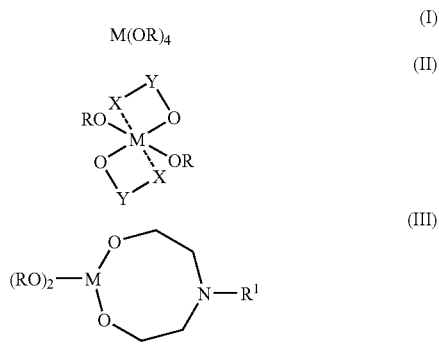

wherein

M is Ti or Zr;

R is a monovalent $C_1$-$C_8$ linear or branched alkyl;

Y is a divalent radical selected from —CH(CH$_3$)—, —C(CH$_3$)=CH$_2$—, or —CH$_2$CH$_2$—;

X is selected from OH, —N(R$^1$)$_2$, —C(O)OR$^3$, —C(O)R$^3$, —CO$_2^-$A$^+$; wherein R$^1$ is a —CH$_3$ or $C_2$-$C_4$ linear or branched alkyl, optionally substituted with a hydroxyl or interrupted with an ether oxygen; provided that no more than one heteroatom is bonded to any one carbon atom;

R$^3$ is $C_1$-$C_4$ linear or branched alkyl;

A$^+$ is selected from NH$_4^+$, Li$^+$, Na$^+$, or K$^+$.

The one or more metal member(s) are heated to a temperature equal or higher than at least one of the melting points of the plurality of metal particles included in the resin composition. The heating of the metal member(s) may be done partially or completely outside the mold cavity. In one embodiment heating the metal member(s) are performed in the mold by induction heating. In one embodiment the resin solidification point is higher than the melting point of the metal particles, and the one or more metal member(s) are heated to a temperature between the resin solidification temperature and the melting point of the resin. In a preferred embodiment the one or more metal member(s) are heated to a temperature at least +10° C. over the resin solidification point and the resin melting point. In another embodiment wherein the resin solidification point is lower than the melting point of the metal particles, the one or more metal member(s) are heated to a temperature between the metal particles melting point and the metal particles melting point+100° C. In a preferred embodiment the one or more metal members(s) are heated to a temperature between the metal particles melting point and the metal particles melting point+50° C. The metal members can be heated using well known heating methods such as induction heating (IH) or resistance heating, and preferably induction heating.

Figure 2:
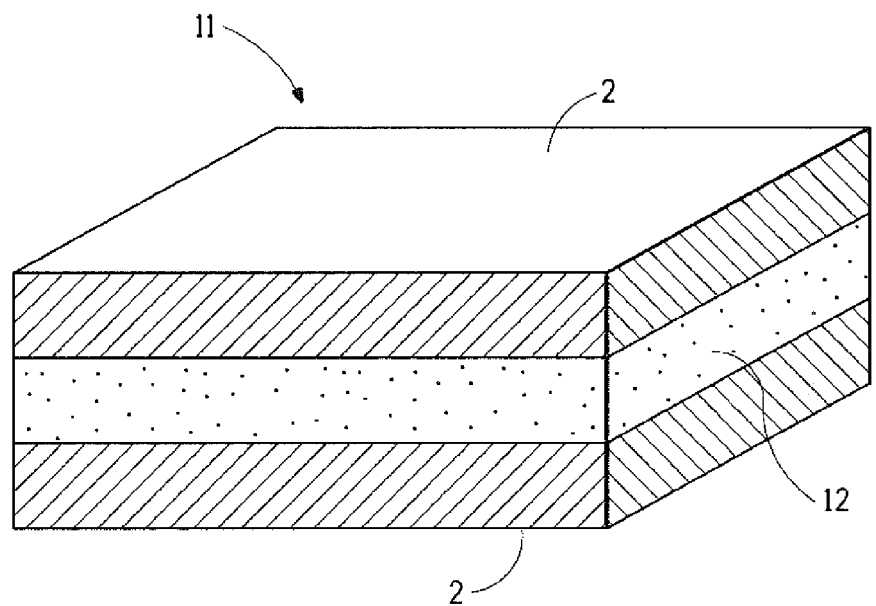
FIG. 2 illustrates a composite molded product provided by the method of the invention.
Figure 3:
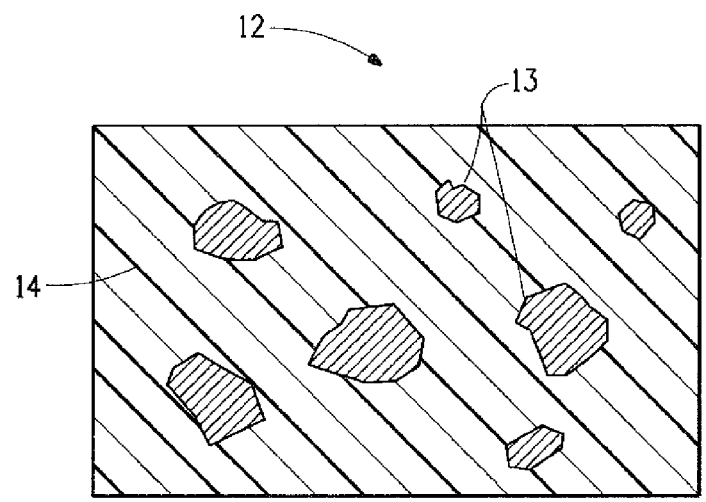
FIG. 3 illustrates the metal particles within the resin used for practicing the method of the invention.

The resin composition is heated to a temperature higher than the resin melting point (if present) or higher than the glass transition temperature; and higher than one or more metal melting points to provide a heated resin. The heated resin is then injected into the mold cavity having the one or more heated metal member(s) to contact said metal member exposed surface to provide a heated composite member. In this way, the metal particles will contact the exposed surface of the one or more heated metal member(s), and afford a firm junction between the metal particles, in their molten state, and the heated metal member(s); as well as greater interfacial junction strength between the metal member(s) and resin member. The interfacial junction strength is preferably at least 3 MPa, and more preferably at least 10 MPa. An exemplary embodiment of a composite member (11) of the invention is illustrated in FIG. 2 in which two metal members (2) are joined by a resin composition (12). FIG. 3 further illustrates an exemplary embodiment of a resin composition (12) having metal particles (13) and a resin (14).

The junction strength can be determined by a tensile tester equipped with a load cell, and tests can be conducted by attaching to each of the metal members and resin members a jig for attachment to the tester. The junction strength can also be assumed to be at or over the breaking strength of the resin member if the resin member becomes broken when the metal member and resin member are separated off the tester.

In another embodiment, the mold cavity optionally has at least one mold cavity exposed surface that may be heated, in addition to the one or more metal member(s). This can lead to the undesirable result of the resin composition becoming joined to the mold cavity exposed surface. It is desirable to have a mold cavity exposed surface wherein part, and preferably all of, said surface is treated to inhibit adhesion with the metal particles. For example, the mold cavity exposed surface can be treated with fluoropolymer release agents.

Cooling the heated composite member below the resin solidification point, solidifies the resin composition and allows the composite member to be released from the mold. The solidification point is the point in the cooling cycle wherein the resin solidifies, and no longer flows; either by cooling below the glass transition of the resin; or by cooling below the crystallization point of the resin. Depending on the type of resin composition, cooling may include turning off the induction heaters; and cooling the resin by lowering the mold temperature to or below the matrix resin solidification temperature with a cooling medium that passes through the mold.

Another embodiment of the invention is a composite member made by the method of the invention as disclosed above. Another embodiment is a composite member made by the method of the invention as disclosed above that is an electronic component. A further embodiment is said electronic component that further comprises a light emitting diode.

Another embodiment is a composite member made by the method of the invention as disclosed above that is an automotive component. A further embodiment is said automotive component that further comprises a light emitting diode.

The composite member obtained by the method of the invention can be used in a wide range of applications such as electronic products, automotive products, electrical products, and industrial machinery products. Electronic products include illumination devices with LEDs, hard disks, and the like.

Materials

HTN501:
Zytel® HTN 501, supplied by E.I. du Pont de Nemours and Co., is a copolyamide made from terephthalic acid, adipic acid, and hexamethylenediamine; wherein the two acids are used in a 55:45 molar ratio. Melting temperature and solidification temperature measured by DSC are 310° C. and 273° C. (cooling cycle), respectively.

Sn—Ag—Cu Alloy:
having a melting point (peak temperature) of 219° C. measured by DSC and a mean particle diameter of 20 μm, supplied by Senju Metal Industry Co., Ltd in Japan. Copper powder: Cu powder having a mean particle diameter of 10 μm.

Graphite:
CB-150 supplied by Nippon Graphite Industries, Ltd in Japan.

Example 1

Pellets of a resin composition listed in Table 1 were prepared using a twin-screw extruder.

TABLE 1

|  | Example 1 (Vol %) |
| --- | --- |
| HTN501 | 71 |
| Sn—Ag—Cu alloy | 4 |
| Copper powder | 3 |
| Graphite | 22 |

As illustrated in FIG. 1, two 1 mm thick aluminum plates were inserted into a mold cavity in which an induction heater (IH) system had been embedded. The mold was closed, the aluminum plates [metal members (2)] and mold heated via the induction heaters until the mold surface contacting the aluminum plates had reached 250° C. The pellets of resin composition of Table 1 was heated to 320° C., melted, and injected into the mold. The mold temperature was lowered to 150° C., and a metal/resin composite member as illustrated in FIG. 2 was removed from the mold.

When attempts were made to separate the aluminum and resin, the resin broke, revealing that the aluminum and resin were firmly bonded. Because the resin broke, the interfacial junction strength between the metal and resin in the composite product could be assumed to be at least 62 MPa, which was the breaking strength of the resin.

Comparative Example 1

A metal/resin composite member was prepared in the same manner as in Example 1 except that a 35% glass fiber reinforced high-melting polyamide (Zytel (R)HTN 51G35L supplied by E.I. du Pont de Nemours and Co.) was used as the resin. The resin composition contained no metal particles having a melting point in the range of 130-400° C.; but had a resin melting point of 300° C. Inspection of the resulting composite member, showed the aluminum plates and resin were not joined at all.

Comparative Example 2

A metal/resin composite molded product was prepared in the same manner as in Example 1 except that the mold temperature was fixed at 150° C. (below the melting point of at least one of the metal particles) with an oil temperature control system instead of an IH system to inject the resin composition into the mold. Inspection of the resulting composite member, showed the aluminum plates and resin were not joined at all.

As shown above, the method of the present invention provides a metal/resin composite member of high strength. Adequate strength was not obtained when the resin composition contained no metal particles having a melting point in the range of 130-400° C. (Comparative Example 1) or when the mold temperature was lower than the melting point of the metal particles (Comparative Example 2).

What is claimed is:

1. A method for producing a composite member having a metal member and a resin member, the method comprising the steps of:
   a) providing a resin composition comprising (i) thermoplastic resin having a resin melting point and/or a glass transition, and a solidification point; and (ii) a plurality of metal particles having one or more metal melting points between about 130° C. and 400° C.;
   b) disposing one or more metal member(s) in a mold cavity, each said metal member(s) having at least one exposed surface, and said mold cavity, optionally, having at least one mold cavity exposed surface;
   c) heating the one or more metal member(s) to a temperature equal or higher than at least one of the melting points of the plurality of metal particles to provide one or more heated metal member(s);
   d) heating the resin composition to a temperature higher than the resin melting point and higher than one or more metal melting points to provide a heated resin;
   e) injecting the heated resin into the mold to contact each heated metal member(s) exposed surface to provide a heated composite member;
   f) cooling said heated composite member below the resin solidification point; and
   g) removing the composite member from the mold cavity; to provide said composite member having an interfacial junction strength between said metal member(s) and said resin member of at least 3 MPa.

2. The method of claim 1, wherein heating the metal member is performed in the mold by induction heating.

3. The method of claim 1, wherein the metal particles are a Sn alloy or Li alloy.

4. The method of claim 1, wherein the metal particles are selected from the group consisting of Sn—Cu alloys, Sn—Sb alloys, Sn—Al alloys, Sn—Zn alloys, Sn—Pt alloys, Sn—Mn alloys, Sn—Ag alloys, Sn—Ag—Cu alloys, Sn—Ag—Cu—Bi alloys, Sn—Ag—Cu—Sb alloys, Sn—Au alloys, Al—Li alloys, and Zn—Li alloys.

5. The method of claim 1, wherein part, or all of, at least one mold cavity exposed surface is treated to inhibit adhesion with the metal particles.

6. The method of claim 1, wherein the metal member and resin member have an interfacial junction strength of at least 10 MPa.

7. The method of claim 1, wherein the metal particles in the resin composition are in a molten state in step e).

8. The method of claim 1, wherein the metal particles in the resin composition are in a molten state in step d).

9. The method of claim 1 comprising 1 to 10 vol. % of the metal particles.

10. The method of claim 1 comprising 3 to 10 vol. % of the metal particles.

11. The method of claim 1 comprising 1 to 7 vol. % of the metal particles.

12. The method of claim 1 comprising 3 to 7 vol. % of the metal particles.

13. The method of claim 1, wherein the resin composition is a polyimide resin.

14. The method of claim 1, wherein the resin composition is a copolyamide, the copolyamide comprising terephthalic acid, adipic acid, and hexamethylene diamine.

* * * * *